UNITED STATES PATENT OFFICE.

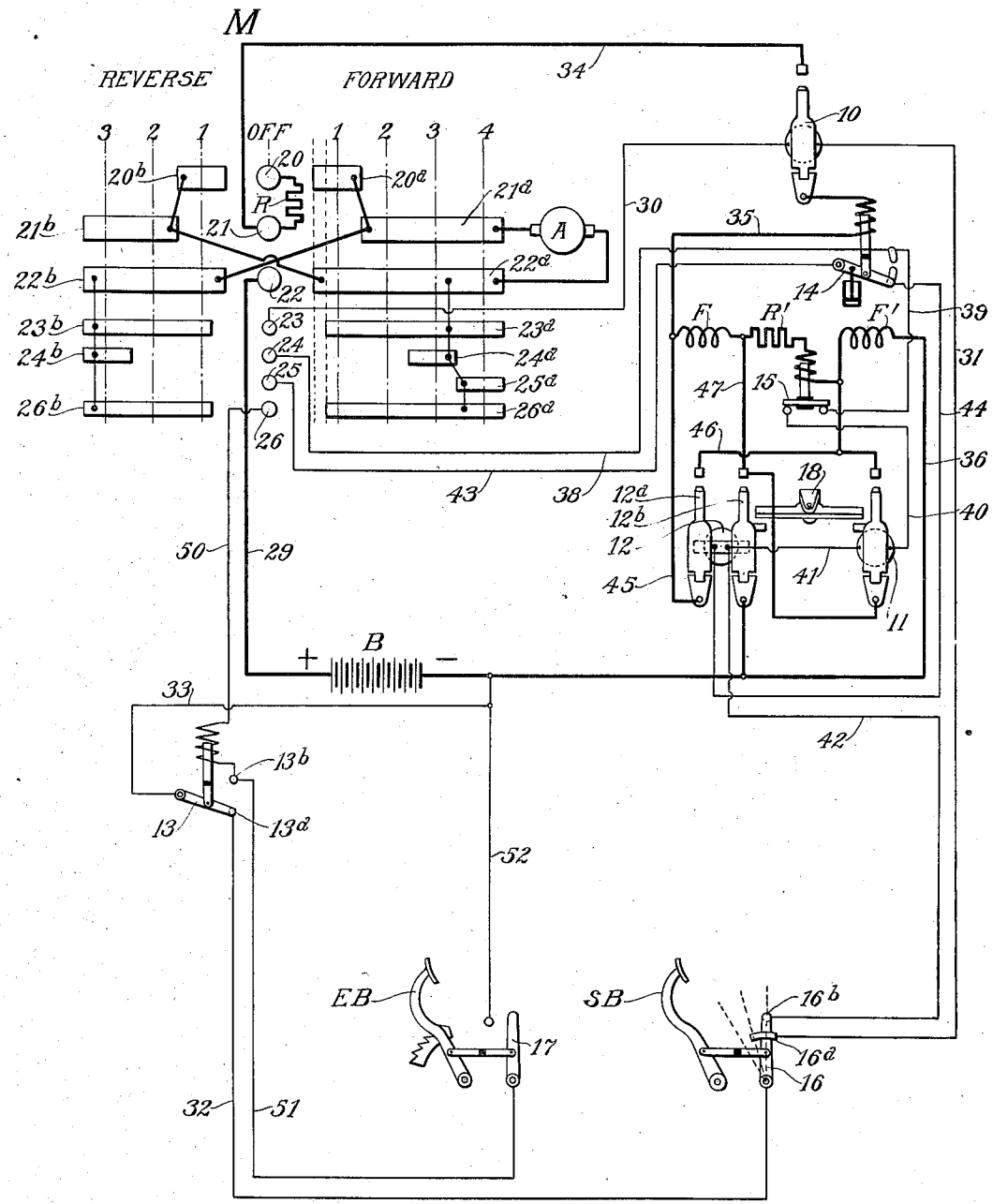

GUY R. RADLEY, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,144,431.  Specification of Letters Patent.  Patented June 29, 1915.

Application filed January 25, 1913. Serial No. 744,231.

*To all whom it may concern:*

Be it known that I, GUY R. RADLEY, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to controllers for electric motors, and is particularly adapted to controllers for electric automobiles.

It has among its objects to provide improved means for changing the field windings of the motors from series to parallel and vice versa.

A further object is to provide a vehicle controller through which the motor may be stopped by the emergency brake lever but which will positively preclude the motor from being restarted by the emergency brake lever.

A further object is to provide a vehicle controller which will enable the motor to be stopped by either the emergency or service brake levers and restarted by the service brake lever, but which will insure against restarting by the emergency brake lever.

My invention also has various other objects and advantages which will hereinafter appear.

In order to clearly and fully disclose the nature and advantages of my invention I shall describe the controller diagrammatically illustrated in the accompanying drawing, which embodies my invention in one form. It should, of course, be understood that my invention might be embodied in other forms than that selected for the purpose of illustration.

The controller illustrated in the accompanying drawing is of a type particularly suitable for electric automobiles and is shown as applied to one employing a series motor which is supplied with current from a single battery. The motor is illustrated as provided with an armature A and two field coils F and F' and as supplied with current from a battery B.

Briefly described, the controller comprises a number of magnetic switches controlled by a master switch M, a service brake lever SB, and an emergency brake lever EB in a manner hereinafter set forth. The magnetic switches include a main line switch 10, a starting resistance switch 11, a field control switch 12, an interlocking relay switch 13, and two throttling relay switches 14 and 15 the former for the field switch and the latter for the starting resistance switch. Relay switch 15 may be omitted if desired. The master switch M is schematically illustrated as of the drum reverse type. It is also illustrated as adapted to control a resistance R in series with the motor armature to effect the first step of acceleration of the motor. The master switch, upon initial movement from off position, establishes the direction controlling connections and completes the motor circuit except as interrupted by the main switch. When moved to its full first position it energizes the main line switch 10 thereby completing the motor circuit with the field windings in series and with the starting resistance R, and also a second starting resistance R', in series with the motor. The master switch in its second position removes the starting resistance R from circuit. The master switch in its third position energizes the resistance switch 11, subject to the retardation by the throttling relay 15, to remove from circuit the resistance R'. The master switch in its fourth position tends to deënergize the resistance switch 11 and energize the field switch 12 to connect the field windings in parallel subject to retardation by the throttling relay 14.

The service brake lever operates a switch 16, which, when moved upon application of the brake first deënergizes the field switch or resistance switch, and then deënergizes the main switch. Upon its return movement it first energizes the main switch and then energizes the resistance switch or field switch or both as will hereinafter appear. The interlocking relay switch 13 is also adapted to deënergize the main switch 10 and thereby stop the motor. Further, the relay 13, when energized, is self-maintaining until the master switch is moved to off position. The function of this switch is to interlock the master switch and the emergency brake switch. The emergency brake lever operates a switch 17 to energize the interlocking relay switch 13 when the emergency brake is applied. The emergency brake switch is therefore adapted to stop the motor but is ineffective to restart the motor. The transition of the field windings from series to parallel is as follows. The step of starting resistance R' is connected between the field windings, and, after removal from circuit by the switch 11, is reinserted prior to operation of the field switch 12. To insure this reinsertion the switches 11 and 12 are preferably interlocked, as by means of the mechanical interlocking device 18, to insure the opening of switch 11 prior to closure of the switch 12. Switch 12, by means of two poles, connects the two field windings and the resistance R' in three parallel circuits, the resistance R' maintaining the continuity of the motor circuit during the change from series to parallel and vice versa.

The resistance R' performs a three fold function. As above stated, it constitutes a step of starting resistance and as such is controlled by switch 11. Also, as above stated, it maintains the continuity of the motor circuit as the field windings are changed from series to parallel and vice versa. Its third function results from its connection in parallel with the field windings when connected in parallel. Due to this connection it further decreases the field strength of the motor and thereby causes an increased speed over that obtainable by mere parallel connection of the field windings. The utilization of a single resistance for these three functions is obviously very advantageous. The relay switch 14 also performs a plurality of functions. As above stated, it throttles the field switch 12. It also performs another important function. As will be hereinafter more fully set forth, it prevents a too quick reinsertion of the resistance R' and a consequent delay in the parallel connection of the field windings due to telegraphing of the relay and field switch should the master switch be moved quickly past the third position. It accomplishes this by establishing a circuit for the switch 11 in shunt with the master switch and maintaining said circuit while abnormal conditions prevail in the motor circuit. This also is a very advantageous feature since electric vehicles are often operated by inexperienced and careless persons.

More specifically set forth the operation of the controller is as follows. Let it be assumed that the master switch is moved for forward operation. Upon initial movement in such a direction the master switch first establishes connections between its contact fingers 20 and 22 and their respective segments 20$^a$ and 22$^a$. This establishes connections for the motor which will cause it to operate in a forward direction when the main switch is closed. Upon continued movement of the master switch to its full first position, its fingers 23 and 26 engage its segments 23$^a$ and 26$^a$ respectively. This establishes a connection from the positive side of the battery by conductor 29 through finger 22 and segment 22$^a$ to segment 23$^a$ and finger 23 by conductor 30 through the operating winding of main switch 10, by conductor 31 through contact 16$^a$ of the service brake switch 16, by conductor 32 through the relay switch 13, which is normally in engagement with contact 13$^a$, and thence by conductor 33 to the negative side of the battery. The main switch 10 thereupon closes, completing the motor circuit from segment 22$^a$ through the motor armature A to segment 21$^a$, thence to segment 20$^a$ and contact finger 20 through the resistance R by conductor 34 through main switch 10 and through the operating winding of relay 14, by conductor 35 through the field winding F, resistance R', winding of relay 15 and field winding F', all in series, by conductor 36 to the negative side of the battery. The motor is thus set in operation with two steps of starting resistance in series therewith and with its field windings in series with one another. When the master switch is moved to its second position its finger 21 engages its segment 21$^a$, thereby short-circuiting the starting resistance R. This constitutes the first step of acceleration. The master switch when moved to its third position makes contact between its segment 24$^a$ and finger 24. This completes the circuit of the operating winding of the resistance switch 11. This circuit may be traced from the positive side of the battery to segment 22$^a$ thence to segment 24$^a$ and finger 24, by conductors 38 and 39 through the relay switch 15 by conductor 40 to the operating winding of resistance switch 11, by conductors 41 and 42 through service brake switch 16 and its contact 16$^b$, by conductors 32 and 33 to the negative side of the battery. The switch 11 thereupon responds, subject to retardation by the relay switch 15 upon an excessive surge of current in the motor circuit and upon response short-circuits the resistance R'. The short circuiting of the resistance R' constitutes the second step of acceleration. The relay switch 15 may, as above set forth, be omitted if desired. The master switch upon movement to its fourth position first causes engagement of its finger 25 with segment 25$^a$ and then separation of its finger 24 and segment 24$^a$. Separation of finger 24 from segment 24$^a$ tends to deënergize the resistance switch 11; but, as just set forth, this operation does not occur until contact is made between finger 25 and segment 25$^a$, which results in completing the energizing circuit of the field switch 12. This circuit may be traced from the positive side of the battery to segment 22$^a$, thence to segments 24$^a$ and 25$^a$ to finger 25, by conductor 43 through the relay switch 14 and in its down position, by conductor 44 through the operating winding of field switch 12, by conductor 42 and thence through the service brake switch and the interlocking switch 13 to the negative side of the battery, as already traced. The switch 12, although energized prior to deënergization of switch 11, cannot close until switch 11 opens, due to the interlock between said switches. Hence reinsertion of the resistance R' by the opening of the switch 11 is insured prior to closure of field switch 12.

Field switch 12 in closing establishes three parallel circuits including the two field coils and the resistance R' and establishes these circuits without interruption of the motor circuit. This is made possible by the use of the resistance R'. The switch 12 is double pole, being provided with two switch members 12ª and 12ᵇ. The member 12ª completes a circuit from the left hand terminal of the field winding F by conductors 45 and 46 to a point between the resistance R' and the field winding F', while the member 12ᵇ, through conductor 47, connects a point between the field winding F and resistance R to the negative side of the battery. Thus the three parallel circuits may be traced as follows: One circuit extends from conductor 35 through the field winding F and switch member 12ᵇ to the negative side of the battery. A second circuit extends from conductor 35 by conductor 45 through the switch member 12ª by conductor 46 through the resistance R', by conductor 47 through the switch member 12ᵇ to the negative side of the battery. The third circuit may be traced from the conductor 35 to conductor 46 and thence through the field winding F' by conductor 36 to the negative side of the battery. The connections of the fields in parallel, of course, results in increasing the speed of the motor and the connection of the resistance in parallel with the field windings augments the increase in speed. This constitutes the third step of acceleration.

The relay switch 14 is, as above set forth, included in the energizing circuit of the field switch 12. The relay 14 has its operating winding in series with the motor and is adjusted to respond when the current conditions in the motor circuits are such as to render the parallel connection of the field windings undesirable. Accordingly should the relay 14 respond when the energizing circuit of the field switch is closed by the master switch, said field switch will not respond until proper conditions are established in the motor circuit and the relay drops into engagement with its down contact. This insures against the premature operation of the field switch. The relay switch 14 also performs another function. Upon responding it engages an up contact connected to conductor 39, which, as before set forth, leads to the operating winding of switch 11. Thus when the relay switch 14 engages its up contact it connects the operating winding of switch 11 to drum finger 25. Accordingly should relay 14 respond upon an attempt to energize the field switch, it would not only prevent the operation of the field switch but would maintain the resistance switch 11 energized and thereby maintain the resistance R' short-circuited until time for the switch 12 to close. Otherwise in passing from position 3 to position 4 the resistance R' might be reinserted in circuit a considerable length of time prior to operation of the field switch and thereby slow down the motor and accordingly delay acceleration thereof and undesirable telegraphing of the relay switch 14 and field switch. Thus even though the master switch is carelessly operated and moved too quickly past the third position the relay 14 will counteract the carelessness and cause the desired operation of the controller.

The service brake switch 16, as above set forth, normally engages both of its contacts 16ª and 16ᵇ. Its contacts, however, are of different sizes so that a partial movement will cause it to disengage contact 16ᵇ, while a full movement will cause it to also disengage contact 16ª. Bearing in mind that the contact 16ª is in the circuit of the main line switch and the contact 16ᵇ in the circuits of both the field switch and resistance switch, it will be seen that the service brake switch may be operated to either deënergize the resistance switch 11 or field switch 12 to slow down the motor or to deënergize the main switch 10 to stop the motor. It will restart the motor in any but the off position of the master controller. When operated to restart the motor it first engages contact 16ª thereby energizing the main switch 10. Thereafter it engages its contact 16ᵇ. This results in energizing resistance switch 11 or successively energizing resistance switch 11 and field switch 12, or only energizing field switch 12 according to the position of the master switch and the electrical conditions. When the master switch is in third position the service brake switch will obviously merely energize the resistance switch. On the other hand, if the master switch is in fourth position it may immediately energize the field switch or it may first energize the resistance switch 11 and then the field switch according to the electrical conditions in the motor circuit and the action of the relay switch 14. For instance, should the vehicle be running on a level down grade, where the motor would pick up in speed very rapidly, the current in the motor circuit might have no effect upon the relay 14 and accordingly said relay might allow the field switch to respond at once. The relay then might remain inert, leaving the field switch closed, or it might respond immediately upon the closure of the field switch and thereby deenergize the same. In the latter event, or in the event that the motor was slow in picking up speed, causing the relay 14 to respond before the energizing circuit of the field switch was closed, then the relay would cause the resistance switch to respond prior to response of the field switch and thereby insure a more gradual acceleration of the motor.

It will thus be observed that the controller is designed to automatically protect the motor in restarting by means of the service brake switch, and when essential to the protection of the motor, to cause the magnetic switches to operate in the same sequence as when controlled by the master switch. On the other hand, the arrangement is such that a very rapid acceleration may be obtained through the medium of the service brake switch if not detrimental to the motor. The provision for this rapid acceleration is highly advantageous in the case of motor vehicles which are often required to start very quickly to avoid congestion of traffic and to avoid collisions.

Of course the resistance R is not utilized in restarting the motor by the service brake switch unless the master switch happens to be in its first position; this, however, is an advantage rather than a disadvantage. As above set forth, rapid acceleration is often times highly desirable. The means controlled by the service brake switch affords full protection to the motor. Thus by omitting the resistance R step of acceleration from the service brake switch a more rapid acceleration is obtainable without endangering the motor. On the other hand, the association of the resistance R with the master switch provides the operator with means for obtaining a more gradual acceleration if he desires to avail himself of the same, and this additional step of acceleration might be found very useful under some conditions. The emergency brake switch 17 is also adapted to stop the motor through the agency of the interlocking relay 13. This switch is normally open and is adapted to be closed upon application of the emergency brake to complete the energizing circuit of the relay 13. This circuit may be traced from the positive side of the battery to finger 22, segment 22$^a$, thence to segments 26$^a$ to finger 26 by conductor 50 through the operating winding of relay 13 and through contact 13$^b$ of said relay by conductor 51 through the switch 17, by conductor 52 to the negative side of the battery. The interlocking relay thereupon responds, deënergizing the main switch 10, and thereby disconnecting the motor from circuit. Also, upon responding the relay switch 13 engages its contact 13$^b$, thereby establishing a self-maintaining circuit in parallel with the switch 17. The segment 26$^a$ of the master controller engages the finger 26 in all running positions of the master controller. It is therefore obvious that it is necessary to return the master switch to off position to deënergize the relay 13. Deënergization of the relay 13 is an essential prerequisite to the closure of the main line switch 10 and accordingly it is clearly impossible to restart the motor after the same has been stopped by the emergency brake switch without first returning the master switch to off position.

The reverse side of the master controller is provided with segments 21$^b$, 23$^b$, 24$^b$, and 26$^b$ which correspond to segments 21$^a$, 23$^a$, 24$^a$ and 26$^a$ and perform the same functions on reversal. In addition it is provided with segments 20$^b$ and 22$^b$ which perform the same functions as segments 20$^a$ and 22$^a$ except that they cause a reversal of the flow of current through the motor armature and accordingly a reversal of the direction of operation of the motor.

What I claim as new and desire to secure by Letters Patent is:

1. A controller for an electric motor having a plurality of series field windings comprising armature and field connections for the motor, a single-throw switch for controlling said field connections to effect either series or parallel connection of the field windings and a resistance associated with said switch to maintain the continuity of the motor circuit during said change in said field connections.

2. A controller for an electric motor having a plurality of series field windings comprising armature and field connections for the motor, a single throw double-pole switch controlling said field connections for effecting either series or parallel connection of the field windings and a resistance associated with said switch and said connections to maintain the continuity of the motor circuit during said change in the field connections.

3. In a controller for motors having a plurality of series field windings, in combination, motor connections including variable connections for the motor field windings, a resistance, and a single throw double-pole switch controlling said variable field connections and said resistance to establish series connections for the field windings including said resistance or parallel connections for the field windings with a shunt therefor including said resistance, said switch effecting said changes without interruption of the motor circuit.

4. In a controller for an electric motor having a plurality of series field windings, in combination, variable motor connections including a series resistance and a single throw double-pole switch for varying said connections to establish parallel connection of the field windings with said resistance in shunt therewith, said resistance maintaining the continuity of said motor connections during said change in the field connections.

5. In a motor controller, in combination, two electro-responsive switches, one to be energized and deënergized prior to response of the other, and means automatically operating to retard the response of said latter switch and upon operation tending to prevent the deënergization of said former switch.

6. In a motor controller, in combination, two switches, one to be energized and deënergized prior to response of the other, a common master switch therefor adapted when moved to a position to energize said latter switch to open the energizing circuit of the former switch, and means automatically operating to retard the response of said second mentioned switch and to render said movement of said master switch ineffective to deënergize said first mentioned switch.

7. In combination, two electro-responsive accelerating switches one to be energized and deënergized prior to response of the other, and a relay associated with said switches and automatically responsive under predetermined conditions to deënergize said latter switch and again energize said former switch.

8. In combination, two electro-responsive acceleration switches one to be energized and deënergized prior to response of the other, a relay associated with said switches and automatically responsive under predetermined conditions to deënergize said latter switch and again energize said former switch, said relay upon returning to normal position successively deënergizing said former switch and energizing said latter switch.

9. In a controller for electric motors, in combination, two electro-responsive accelerating switches, and a relay responsive to the current conditions in the motor circuit, said relay upon responding preventing response of one of said switches and tending to maintain the other switch energized and upon returning to normal position deënergizing said latter switch and tending to energize said former switch.

10. In a motor controller, in combination, two electro-responsive switches, a controller therefor adapted when in one position to energize one of said switches and movable to a second position to energize the other switch and open the energizing circuit of said first switch, and a relay adapted upon responding to interrupt the energizing circuit of said second switch and also establish an energizing circuit for said first switch when said master controller is in second position.

11. In a motor controller, in combination, two electro-responsive accelerating switches, interlocking means insuring against simultaneous operation of said switches, a master switch adapted when in one position to energize one of said switches and movable to a second position to energize the second switch and open the energizing circuit of the first switch, and a relay responsive to current conditions in the motor circuit to open the energizing circuit of said second switch and also close an energizing circuit for said first switch when said master switch is in said second position.

12. In a controller for electric motors having a plurality of series field windings, in combination, a resistance to be included in the motor circuit, a switch for removing said resistance to accelerate the motor, a field switch for changing the connections of the motor field windings from series to parallel said latter switch being operable only after operation of said former switch to reinsert said resistance in circuit, and a relay switch operatively associated with both said resistance switch and said field switch.

13. In a controller for electric motors having a plurality of series field windings, in combination, a resistance to be included in the motor circuit, a switch for removing said resistance to accelerate the motor a field switch for changing the connection of the motor field windings from series to parallel said latter switch being operable only after operation of said former switch to reinsert said resistance in circuit, and a relay switch operatively associated with both said resistance switch and said field switch, and adapted upon responding to render said field switch ineffective and until its return to normal position tending to maintain said resistance switch effective.

14. In a controller for electric motors having a plurality of series field windings, in combination, a resistance to be connected between the motor field windings, an electro-responsive switch for removing said resistance from circuit to accelerate the motor, a second electro-responsive switch for changing the connection of the motor field windings from series to parallel and utilizing said resistance to accomplish said change without interruption of the motor circuit, means insuring the reinsertion of said resistance in circuit prior to operation of said second switch, and a relay responsive to the current conditions in the motor circuit and adapted upon responding to interrupt the energizing circuit of said second switch and under predetermined conditions establish an energizing circuit for said first switch and to maintain said circuit until its return to normal position.

15. In a controller for a motor having a plurality of series field windings, in combination, a resistance, and means for utilizing said resistance in series with the motor and in shunt with its field windings for separate steps of acceleration, said means including means for establishing either series or parallel connection of the field windings and utilizing said resistance to maintain the continuity of the motor circuit during said changes in the field connections.

16. In a controller for motor operated vehicles, in combination, electro-responsive means for starting and accelerating the motor, a master switch for said electro-responsive means, a relay responsive to cause said electro-responsive means to stop the motor and to establish a maintaining circuit for itself to necessitate the return of the master switch to a predetermined position prior to its deënergization and a switch operable by a brake mechanism of the vehicle to energize said relay to stop the motor.

17. In a controller for motor operated vehicles, in combination, electro-responsive starting and accelerating means, a master switch therefor, switches operatively connected with the vehicle brake mechanisms for controlling said electro-responsive means to stop the motor, one of said latter switches being also adapted to restart the motor and means preventing restarting of the motor by the other of said switches.

18. In a controller for electric motor operated vehicles, in combination, a master switch for starting and stopping the driving motor, a service brake switch for stopping the motor and restarting the same when said master switch is in running position, an emergency brake switch for stopping the motor and an interlock between said switches necessitating restarting of the motor by said master switch after the motor has been stopped by said emergency brake switch.

19. In a controller for motor operated vehicles, in combination, manually controlled electro-responsive means for starting and accelerating the motor, a relay responsive to cause said means to stop the motor, and a switch operated by a brake mechanism of the vehicle to energize said relay, said relay upon responding establishing a maintaining circuit for itself independent of said switch.

20. In a controller for electric motor operated vehicles, in combination, a switch operable at will for starting and stopping the driving motor, a switch operable by a brake mechanism of the vehicle to stop the motor and an interlock between said switches necessitating restarting of the motor by said first mentioned switch after the motor has been stopped by said second switch.

21. In a controller for electric motor operated vehicles, in combination, manually controlled electro-responsive means for starting and accelerating the motor, a brake operating member and means controlled by movement of said member to cause said electro-responsive means to stop the motor, said second mentioned means including an electro-responsive relay insuring against restarting by subsequent operation of said member.

22. In a motor controller, in combination, electro-responsive starting means for the motor, an electro-responsive relay associated therewith, a switch for energizing said relay to stop the motor, said relay upon responding establishing a maintaining circuit for itself independent of said switch and a second switch controlling said electro-responsive means and relay to start and stop the motor at will.

23. In a controller for a motor having a plurality of series field windings, the combination with a resistance normally connecting the field windings in series and limiting the starting current, of means for excluding said resistance and means for connecting the field windings in parallel, said means being interlocked to insure reinsertion of said resistance in circuit prior to establishment of parallel connections.

24. In a controller for a motor having a plurality of series field windings, the combination with a resistance normally connecting the field windings in series and limiting the starting current, of electro-responsive means for excluding said resistance from circuit and electro-responsive means for connecting the field windings in parallel, said means being interlocked to insure reinsertion of said resistance prior to establishment of said parallel connections.

25. In a controller for a motor having a plurality of series field windings, the combination with a resistance normally connecting the field windings in series and limiting the starting current, of means for excluding said resistance from circuit and means for connecting the field windings in parallel with one another and said resistance, said means being interlocked to insure reinsertion of said resistance in series with said field windings prior to establishment of said parallel connections.

In witness whereof, I have hereunto subscribed my name in the presence of two witnesses.

GUY R. RADLEY.

Witnesses:
F. H. HUBBARD,
S. A. WATSON.